US011636828B1

(12) United States Patent
Fischer et al.

(10) Patent No.: US 11,636,828 B1
(45) Date of Patent: Apr. 25, 2023

(54) SYSTEM AND METHOD FOR AUTOMATICALLY ADJUSTING A COLOR FILTER OF AN INTERFACE

(71) Applicant: Freedom Scientific, Inc., Clearwater, FL (US)

(72) Inventors: Roxana Fischer, Rotterdam (NL); Mohammed Laachir, Amsterdam (NL); Sriram M. Ramanathan, Safety Harbor, FL (US)

(73) Assignee: Freedom Scientific, Inc., Clearwater, FL (US)

(*) Notice: Subject to any disclaimer, the term of this patent is extended or adjusted under 35 U.S.C. 154(b) by 0 days.

(21) Appl. No.: 17/682,650

(22) Filed: Feb. 28, 2022

(51) Int. Cl.
*G09G 5/02* (2006.01)
*G06F 40/117* (2020.01)
*G09G 5/04* (2006.01)
*G09G 5/00* (2006.01)

(52) U.S. Cl.
CPC ........... *G09G 5/024* (2013.01); *G06F 40/117* (2020.01); *G09G 5/005* (2013.01); *G09G 5/04* (2013.01)

(58) Field of Classification Search
CPC .......... G09G 5/024; G09G 5/005; G09G 5/04; G06F 40/117
See application file for complete search history.

(56) References Cited

U.S. PATENT DOCUMENTS

| 2002/0165881 A1* | 11/2002 | Shelton | G06F 3/14 715/275 |
| 2014/0354614 A1* | 12/2014 | Nagashima | G01J 3/506 345/207 |
| 2018/0090047 A1* | 3/2018 | Choi | G09G 3/2003 |
| 2018/0260668 A1* | 9/2018 | Shen | G06T 11/00 |
| 2019/0371262 A1* | 12/2019 | Koo | G09G 5/005 |
| 2020/0134834 A1* | 4/2020 | Pao | G06N 3/0454 |

OTHER PUBLICATIONS

Joe Attardi, Billerica, MA, USA, Modern CSS book, Master the Key Concepts of CSS for Modern Web Development 2020, p. 230 (Year: 2020).*
Google Chrome. Auto Dark Mode of Web Contacts. Experiments. Date Accessed: Mar. 21, 2022. chrome://flags/#enable-force-dark.
(Continued)

*Primary Examiner* — Sahlu Okebato
(74) *Attorney, Agent, or Firm* — Anton J. Hopen; Smith & Hopen, P.A.

(57) ABSTRACT

A system and method of automatically adjusting an optimal color orientation displayed on a computing device, particularly for users experiencing light sensitivity when interacting with the computing device. The system and method automatically query whether an application includes native color inversion settings, such that operating system and/or application settings need not be continuously toggled between active and inactive states. Accordingly, the display of the computing device is automatically optimized, such that either the operating system's color inversion settings are selected (in the absence of an application's native color inversion settings), or the application's color inversion settings are selected with the operating system's settings being automatically deactivated.

12 Claims, 8 Drawing Sheets

(56) References Cited

OTHER PUBLICATIONS

Stack Overflow. Is there a way to detect if Chrome's Devtools are using dark mode?. Date Posted: Feb. 2017. Date Accessed: Mar. 21, 2022. https://stackoverflow.com/questions/41961037/is-there-a-way-to-detect-if-chromes-devtools-are-using-dark-mode.

Stack Overflow. How to detect Windows 10 light/dark mode in Win32 application?. Date Posted: Jul. 2018. Date Accessed: Mar. 21, 2022. https://stackoverflow.com/questions/51334674/how-to-detect-windows-10-light-dark-mode-in-win32-application/56809156#56809156.

Freedom Scientific, Inc. ZoomText User Guide. 2019: 1-312. https://www.zoomtext.com/docs/zt2019/ZoomText_2019_User_Guide_English_US.pdf.

\* cited by examiner

SYSTEM AND METHOD FOR AUTOMATICALLY ADJUSTING A COLOR FILTER OF AN INTERFACE

BACKGROUND OF THE INVENTION

1. Field of the Invention

This invention relates, generally, to color filters on user interfaces. More specifically, it relates to a system and method for automatically adjusting a color filter displayed on an interface, such as a website, particularly for users suffering from symptoms associated with light sensitivity.

2. Brief Description of the Prior Art

Traditional displays on electronic devices utilize dark characters and images overlayed on a light background. Such traditional settings are typically seen on displays associated with word processor applications, which display a white page and black characters. While these default settings of a lighter background and darker characters (as shown in FIG. 1A) are satisfactory to many users, those with light sensitivity issues may struggle with dark-on-bright settings. For users suffering from symptoms associated with light sensitivity, the bright background may cause discomfort, reduce usable vision, and limit the ability to read the darker text on the display as the brighter background is perceived to overlay the darker text (as shown in FIG. 1B).

With increasing access to accessibility settings, some locally-executed programs include a setting to adjust the colors on the display, such as by inverting the bright-and-dark orientation. For example, some programs include a "dark mode" functionality, in which the background inverts to be darker with the text overlayed on the background being lighter (as shown in FIG. 1C). For users that suffer from light sensitivity, the brightness experienced by the users is limited to the text as opposed to the larger background. As such, users experience less eye strain, and the brighter text does not fade into the background as is experienced with traditional display settings.

Under currently available systems, color inversion can be applied through three main pathways—an operating system-wide adjustment, a program-specific adjustment, and an individual component of a system adjustment. If a user utilizes an operating system-wide adjustment, the entire display of the electronic device inverts in color, such that in a default configuration, the traditionally bright background is darker than any text or images overlayed thereon. However, to successfully implement an operating system-wide adjustment, applications must include an ability to change colors between the background and the text. If an application includes a color inversion capability, the operating system and the application together provide the user with a natural appearance, in which the main colors are inverted while maintaining the shadows and depth effects of both the background and the text/images. On the contrary, if the application does not include a color inversion capability, the display would include the traditional lighter background and darker text, thereby negatively impacting a user experiencing light sensitivity.

For a program-specific adjustment, an individual executable application, such as a web browser, includes an adjustment function to invert the colors displayed on the individual executable application. Similarly, for an individual component adjustment, a user can adjust a color setting for one or more components of an overall application—for example, a webpage launched on a web browser can include a native adjustment option designed for the webpage. Similar to the operating system-wide adjustment, the program-specific and component-specific adjustments are successful in that they are designed and tested to invert colors, such that users experience a balanced color inversion without a downgrade in render quality.

While these separate systems exist, issues arise when a user implements an operating system-wide adjustment protocol in addition to program-specific or component-specific adjustments. Similarly, render quality downgrades can be experienced when utilizing both a program-specific and a component-specific adjustment. For example, when utilizing an operating system-wide adjustment in addition to a program-specific or component-specific adjustment, the display may lack depth and balance as intended by the developer, since the system-wide adjustment alters the view intended through the program-specific or component-specific adjustment. An example of this is the use of a "dark mode" on a web browser, with users experiencing lower image and text quality when the operating system, as opposed to the browser, determines the color inversion. Similar issues are experienced when an individual web page includes a native color inversion function, but the web browser determines the color inversion.

Moreover, some applications lack a color inversion feature entirely. In such scenarios, the operating system-wide adjustment can be utilized when interacting with such applications. However, as noted above, program-specific and component-specific adjustments often provide higher quality color inversions. As such, as a user switches from a program lacking color inversion to a program including color inversion, the user must either manually toggle the operating system-wide adjustment from active to inactive; otherwise, the user would experience a flash of bright light during the application switch, thereby triggering visual discomfort.

Accordingly, what is needed is a system and method for automatically adjusting a color orientation/color filter for a computing device, such that the display includes a consistent and optimized color scheme for users, particularly those with light sensitivity. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in several technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system and method of automatically adjusting an optimal color orientation displayed on a computing device is now met by a new, useful, and nonobvious invention.

The novel method includes the step of selecting, via a processor of the computing device, a default color scheme to be displayed on the display device associated with the computing device. In an embodiment, the default color scheme includes a background that is darker than a foreground. An application is loaded into a memory of the computing device. The processor transmits a media query to the application, with the media query including the selected default color scheme. The method includes a step of receiving, via the application, a native color scheme of the application, with the native color scheme being configured to be displayed on the display device associated with the computing device. The processor compares the selected default color scheme with the received native color scheme.

The method includes a step of automatically displaying the optimal color scheme on the display device associated with the computing device. Based on a determination that the received native color scheme matches the selected default color scheme, the method includes a step of deactivating the selected default color scheme. In addition, based on a determination that the received native color scheme does not match the selected default color scheme, the method includes a step of activating the selected default color scheme.

In an embodiment, the application is a web browser. The step of transmitting the media query to the application includes the step of transmitting a cascading style sheets query from the processor of the computing device to the web browser. In an embodiment, the cascading style sheets query is @media (prefers-color-scheme: dark).

In an embodiment, the method includes a step of, after automatically displaying the optimal color scheme on the display device, receiving an instruction to unload the application from the memory of the computing device. If the method included the step of deactivating the selected default color scheme, the method includes a step of activating the selected default color scheme after receiving the instruction to unload the application. If the method included the step of activating the selected default color scheme, the method includes a step of maintaining the selected default color scheme in an active state after receiving the instruction to unload the application.

A color scheme optimization system for automatically displaying an optimal color scheme on a display device associated with a computing device includes a processor associated with the computing device. A non-transitory computer-readable medium is operably coupled to the processor, with the computer-readable medium having computer-readable instructions stored thereon that, when executed by the processor, cause the color scheme optimization system to automatically display the optimal color scheme on the display device associated with the computing device.

The processor executes instructions from the non-transitory computer-readable medium to selecting, via the processor, a default color scheme to be displayed on the display device associated with the computing device. The instructions include loading, into the non-transitory computer-readable medium, an application. The processor transmits a media query to the application, the media query including the selected default color scheme. The application receives a native color scheme of the application, the native color scheme configured to be displayed on the display device associated with the computing device. The processor compares the selected default color scheme with the received native color scheme. The optimal color scheme is automatically displayed on the display device by either deactivating the selected default color scheme (based on a determination that the received native color scheme matches the selected default color scheme) or activating the selected default color scheme (based on a determination that the received native color scheme does not match the selected default color scheme).

An object of the invention is to provide an automated system and method for adjusting a color scheme displayed to a user experiencing light sensitivity when using a computing device, such that the user experiences an optimal color scheme without a downgrade in quality or overlaying multiple "dark mode" schemes, thereby ensuring that the displayed color scheme displays in the highest quality for a particular program.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1C:
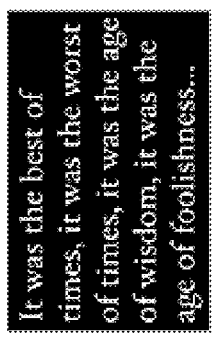
FIG. 1C depicts an embodiment of a "dark mode" color scheme setting that inverts the color scheme of FIG. 1A, including a darker background and a lighter foreground including text.
Figure 1B:
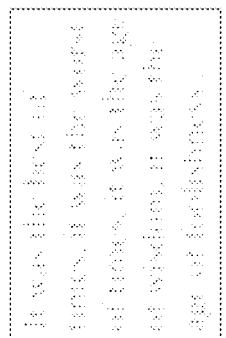
FIG. 1B depicts the default color scheme setting of FIG. 1A as perceived by an individual suffering from symptoms associated with light sensitivity.
Figure 1A:
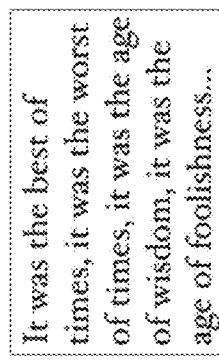
FIG. 1A depicts an embodiment of a default color scheme setting including a lighter background and a darker foreground including text.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, "computing device" includes, but is not limited to, electronic devices that are capable or wired or wireless data transmission and that are capable of graphically displaying data to a viewing user, such as a personal computer, laptop, mobile device, or similar device.

As used herein, "application" includes, but is not limited to, software programs including packages of instructions to perform one or more functions on an electronic device, such as a web browser, word processor, database, or similar software program.

As used herein, "dark mode" refers to a color orientation displayed on a computing device, in which the background color(s) on the display is darker than the foreground text and/or images, also referred to as negative contrast polarity.

As used herein, "bright mode" refers to a color orientation displayed on a computing device, in which the background color(s) on the display is brighter than the foreground text and/or images, also referred to as positive contrast polarity.

The present invention includes a system and method of automatically adjusting an optimal color orientation displayed on a computing device, particularly for users experiencing light sensitivity when interacting with the computing device. If a computing device lacks adjustable color settings, users experiencing light sensitivity typically interact with a display that results in visual discomfort, with the majority of the display (the background) being brighter than the text and/or images on the background. While some operating systems of computing devices include color inversion settings, such that the background can be displayed in a darker setting, and while some applications include similar color inversion settings, a lack of communication between the operating systems and the application can result in a color inversion of poor quality.

As such, the present invention includes a system and method of automatically querying whether an application includes native color inversion settings, such that operating system and/or application settings need not be continuously toggled between active and inactive states. Accordingly, the display of the computing device is automatically optimized, such that either the operating system's color inversion settings are selected (in the absence of an application's native color inversion settings), or the application's color inversion settings are selected with the operating system's settings being automatically deactivated. The system and method will be described in greater detail in the sections herein below.

Figure 2:
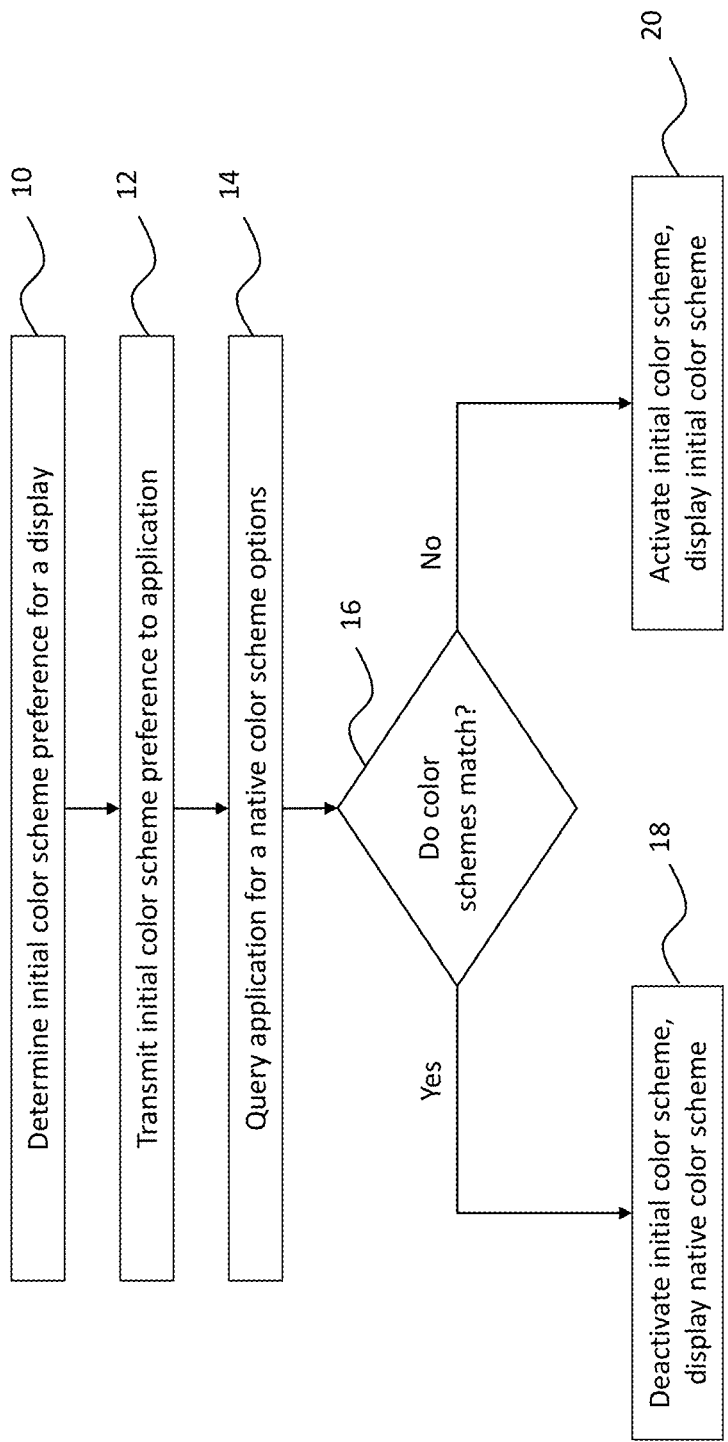
FIG. 2 is a process flow diagram depicting a method of automatically adjusting a color scheme of an application as displayed via a computing device, in accordance with an embodiment of the present invention.

Referring to FIG. 2, an exemplary process-flow diagram is provided, depicting a method of automatically adjusting a color scheme by selecting an optimal color scheme for display on a computing device. The steps delineated in the exemplary process-flow diagram of FIG. 2 are merely exemplary of an order of adjusting a color scheme on a computing device. The steps may be carried out in another order, with or without additional steps included therein.

As shown in FIG. 2, the method includes a step 10 of determining an initial color scheme preference to be displayed via a computing device. In an embodiment, this step includes a processor of the computing device receiving a selection of a color scheme preference, such as from a user of the computing device. The color scheme preference is stored in a memory of the computing device, such that an operating system of the computing device accesses the memory prior to displaying text and/or images on a screen or other display associated with the computing device. As such, after receiving the color scheme preference, the processor of the computing device accesses the memory to select the color scheme preference, such that the selected color scheme preference is displayed to one or more users interacting with the computing device.

For example, in an embodiment, the color scheme preference on an operating system marketed under the trade name MICROSOFT WINDOWS® is determined as follows:

```
using System;
using Windows.UI.ViewManagement;
namespace WhatColourAmI
{
    class Program
    {
        static void Main(string[ ] args)
        {
            var settings = new UISettings( );
            var foreground =
    settings.GetColorValue(UIColorType.Foreground);
            var background =
    settings.GetColorValue(UIColorType.Background);
                Console.WriteLine($"Foreground {foreground} Background {background}");
        }
    }
}
``` wherein a dark mode color scheme preference includes Foreground #FFFFFFFF and Background #FF 000000, and wherein a bright mode color scheme preference includes Foreground #FF000000 and Background #FFFFFFFF.

Accordingly, it should be noted that the color scheme preference described herein is directed toward a dark mode color scheme, which is particularly useful to users experiencing light sensitivity. However, it should be appreciated that a bright mode color scheme could be selected as the preferred color scheme in other embodiments, with similar steps occurring for the automatic selection of an optimal bright mode color scheme.

Figure 3A:
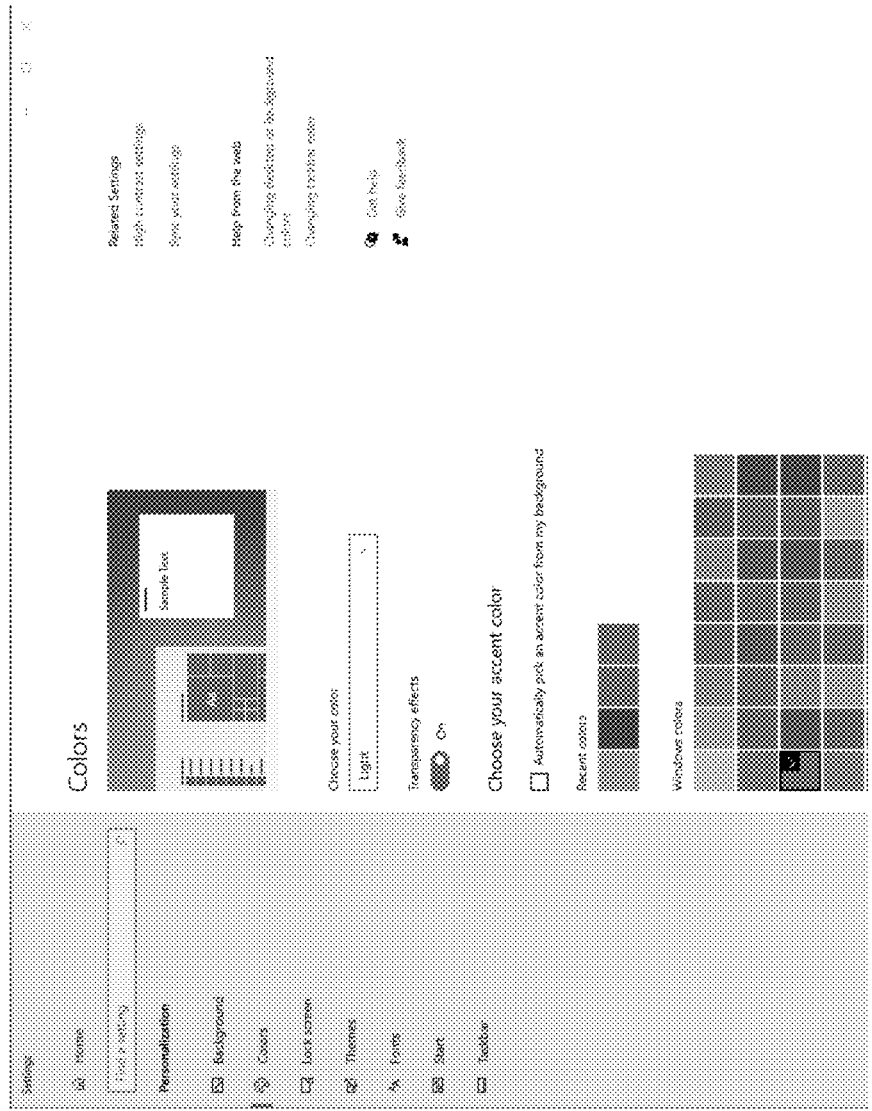
FIG. 3A depicts an embodiment of a selection of a bright mode (or light mode) for an operating system, showing a lighter background and a darker foreground including text, in accordance with and embodiment of the present invention.
Figure 3B:
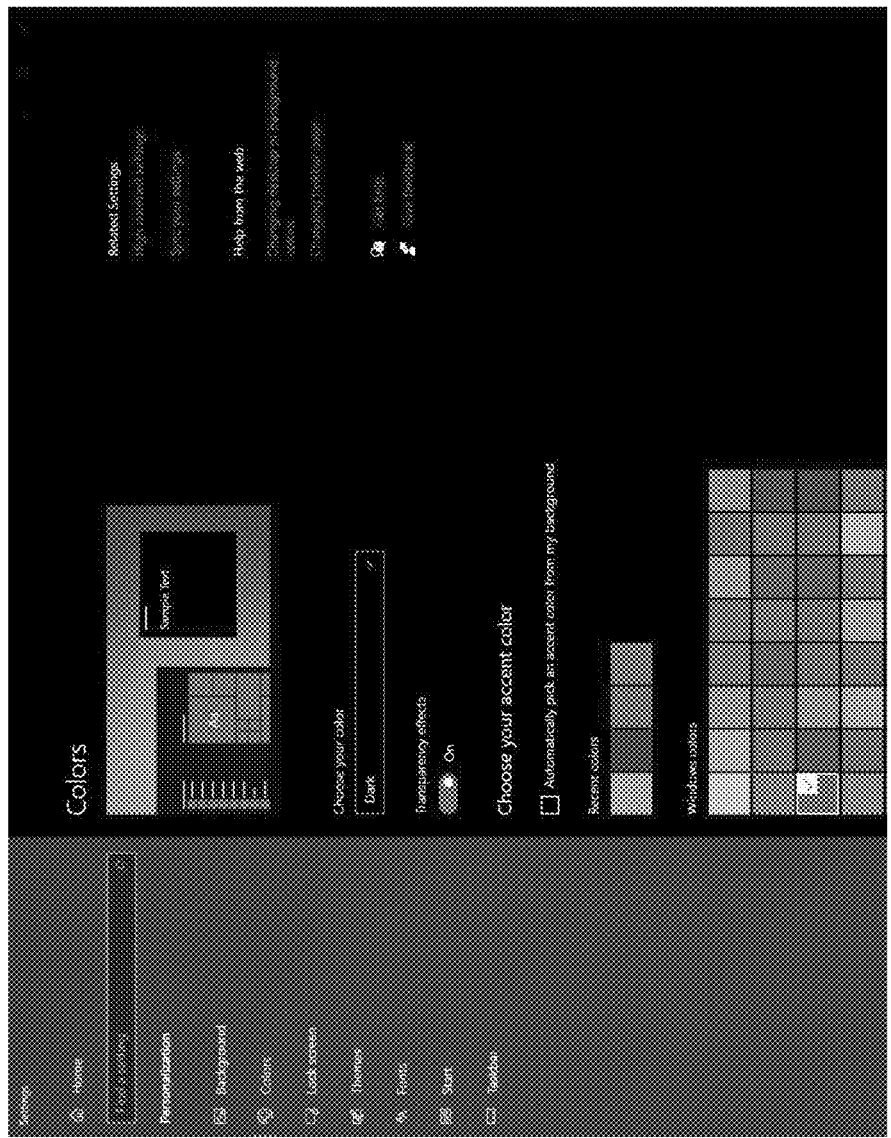
FIG. 3B depicts an embodiment of a selection of a dark mode for an operating system, showing a darker background and a lighter foreground including text, in accordance with and embodiment of the present invention.

An example of the determination of the initial color scheme preference to be displayed via the computing device is shown in FIGS. 3A-3B. As shown in FIGS. 3A-3B, an operating system (in the embodiment, the operating system marketed under the trade name MICROSOFT WINDOWS®) includes a selectable color scheme preference for the display. Specifically, as shown in FIG. 3A, a bright mode (or light mode) color scheme preference is selected, in which the background is brighter than the foreground. In addition, as shown in FIG. 3B, a dark mode color scheme preference is selected, in which the background is darker than the foreground. It should be appreciated that various color schemes can be selected to specify particular color scheme preference (such as by adding a hue for a singular color to create a "theme" for the operating system). However, even in such cases, it should be appreciated that the color scheme includes a contrast between the background and the foreground, such that one of the background and foreground is darker than the opposing spectrum, thereby creating a dark mode (if the background is darker) or a bright mode (if the foreground is darker).

Referring again to FIG. 2, during step 12 of the method, the processor of the computing device transmits the selected color scheme preference to an application that is launched on the computing device. For example, if the application is a web browser that is executable and launched on the computing device, the processor transmits the operating system-level color scheme preference to the web browser during step 12. In addition, during step 14 of the method, the processor of the computing device transmits a query to the application regarding the application's color scheme options—such as the default color scheme for the application and any possible alternative color scheme options for the application. For example, if the application includes a default bright mode color scheme and an optional, native alternative color scheme of a dark mode, the processor of the computing device queries the application to obtain data relating to the default bright mode and the option for the dark mode. In an embodiment, the query transmitted from the processor of the computing device to the application is a CSS (cascading style sheets) media query, such as "@media (prefers-color-scheme: dark)," which correlates to the determined color scheme preference from step 10 of the method.

Next, during step 16 of the method, the processor of the computing device receives the queried results from the application. In an embodiment, the processor of the computing device receives the queried results from a web browser as the application, such as a web browser marked under the trade name GOOGLE CHROME®. In such an embodiment, the processor of the computer device transmits a request for a displayed color scheme (or different color scheme options) from a web page launched in the web browser, such as by using:
chrome.devtools.panels.default,
relating to a default color scheme option for the web page displayed via the web browser;
or by using:
chrome.devtools.panels.dark,
relating to a dark mode color scheme option for the web page displayed via the web browser.

The processor of the computing device then determines whether the application includes a color scheme that substantially matches the selected color scheme of the computing device, as selected and stored in the memory of the computing device during step 10. For example, in accordance with the embodiment described above, during step 16 the processor of the computing device compares the received color scheme from the application with the CSS media query, such as "@media (prefers-color-scheme: dark)." In an embodiment, the CSS query is:
@media (prefers-color-scheme: dark) {
dark-scheme {background: black; color: #ddd;}
}

The method then proceeds to either step 18 or step 20, depending on whether a substantial match exists between the selected color scheme for the computing device and the possible native color schemes for the application.

During step 18, the processor of the computing device determines that a substantial match exists between the selected color scheme (such as "prefers-color-scheme: dark") and a native color scheme for the application. As such, during step 18, the processor executes instructions to deactivate the selected color scheme of the computing device when the application is displayed. Accordingly, the screen or display associated with the computing device includes a native color scheme from the application that substantially matches the selected color scheme for the computing device, such that the display is optimized to include background color and foreground text and/or images without suffering from image quality detractions, such as shading and shadowing issues.

During step 20, the processor of the computing device determines that a substantial match does not exist between the selected color scheme (such as "prefers-color-scheme: dark") and a native color scheme for the application. As such, during step 20, the processor executes instructions to activate the selected color scheme of the computing device when the application is displayed. Accordingly, the screen or display associated with the computing device includes the selected color scheme for the computing device as determined during step 10 of the method.

Figure 4A:
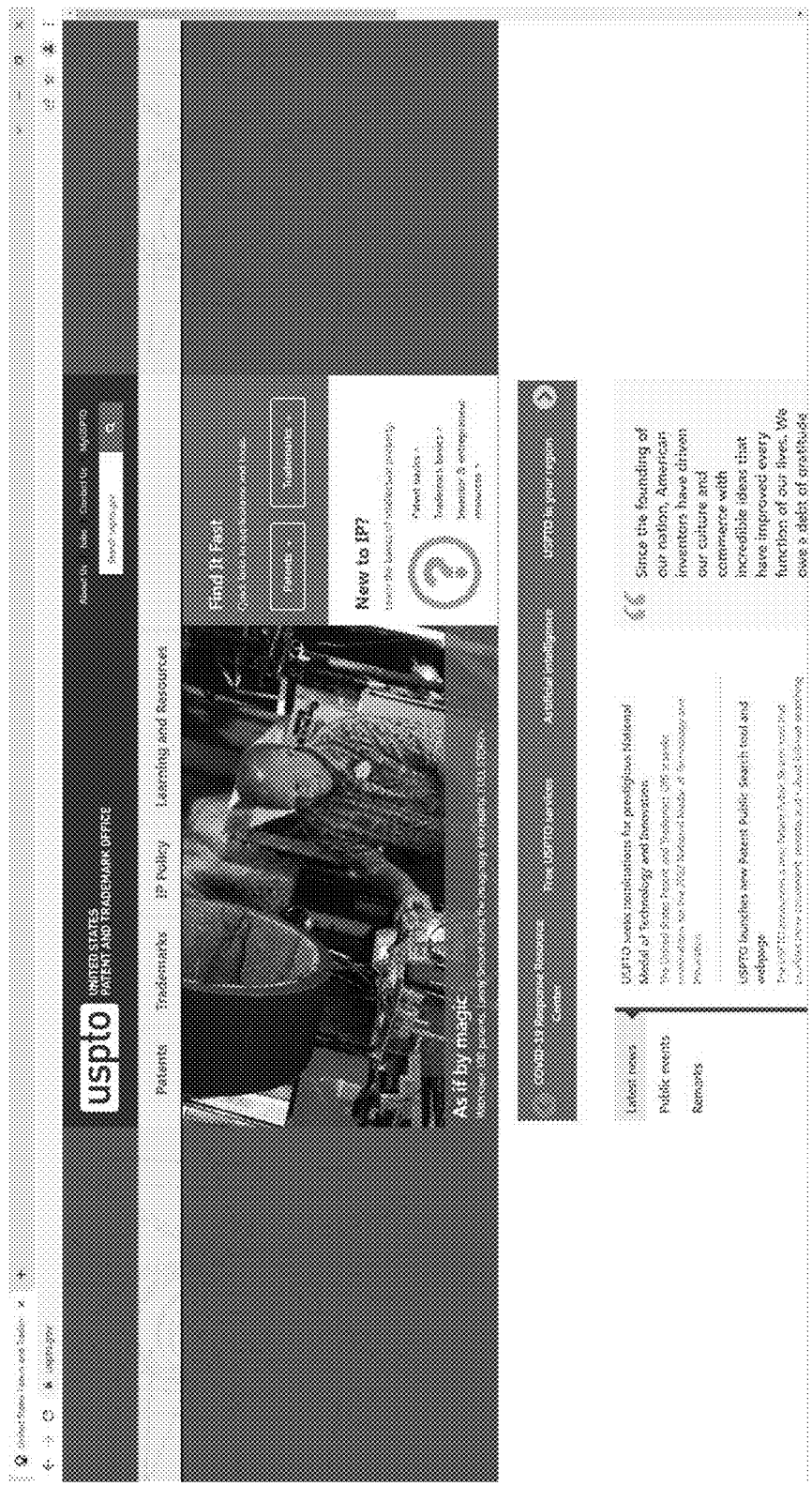
FIG. 4A depicts an embodiment of a web browser launched on a computing device including a bright mode for the web browser and a default bright mode for assets (including text and images) displayed on the web browser, in accordance with and embodiment of the present invention.

An example of a color scheme preference is shown in the embodiments depicted in FIGS. 4A-4D, with each embodiment depicting a web browser. As shown in FIG. 4A in particular, the selected color scheme preference from step 10 of the method described above is a bright mode color scheme, including a lighter background and a darker foreground for the web browser. However, certain assets of the website displayed via the web browser include an inverted color scheme, based on the initial input received by the web browser from the developer of the website. As such, certain displayed assets include a darker background and a lighter foreground.

Figure 4B:
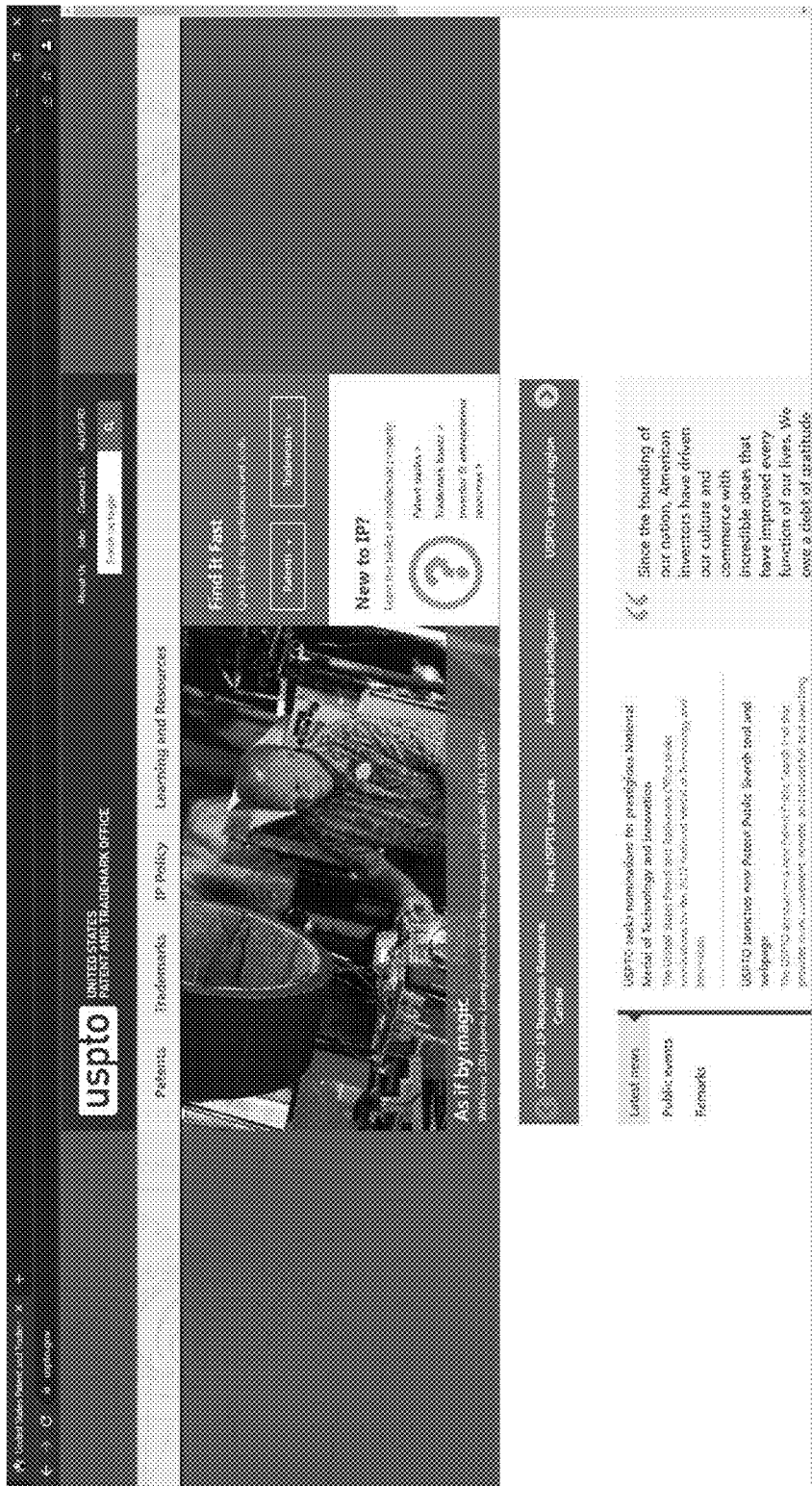
FIG. 4B depicts an alternative embodiment of the web browser of FIG. 4A, including a dark mode for the web browser and a default bright mode for assets (including text and images) displayed on the web browser, in accordance with and embodiment of the present invention.

Turning now to FIG. 4B, the selected color scheme preference from step 10 of the method described above is a dark mode color scheme, including a darker background and a lighter foreground for the web browser. The color scheme of the web browser, as displayed via the computing device, includes the dark mode color scheme as selected during step 10 of the method, such that the web browser itself is depicted with the selected color preference. However, the assets of the website based on the initial input received by the web browser from the developer of the website remain unchanged in the absence of an instruction to do so. As such, the assets of the website are displayed in the default color scheme as input by the web developer, rather than changing to the selected color preference from step 10 of the method.

Figure 4C:
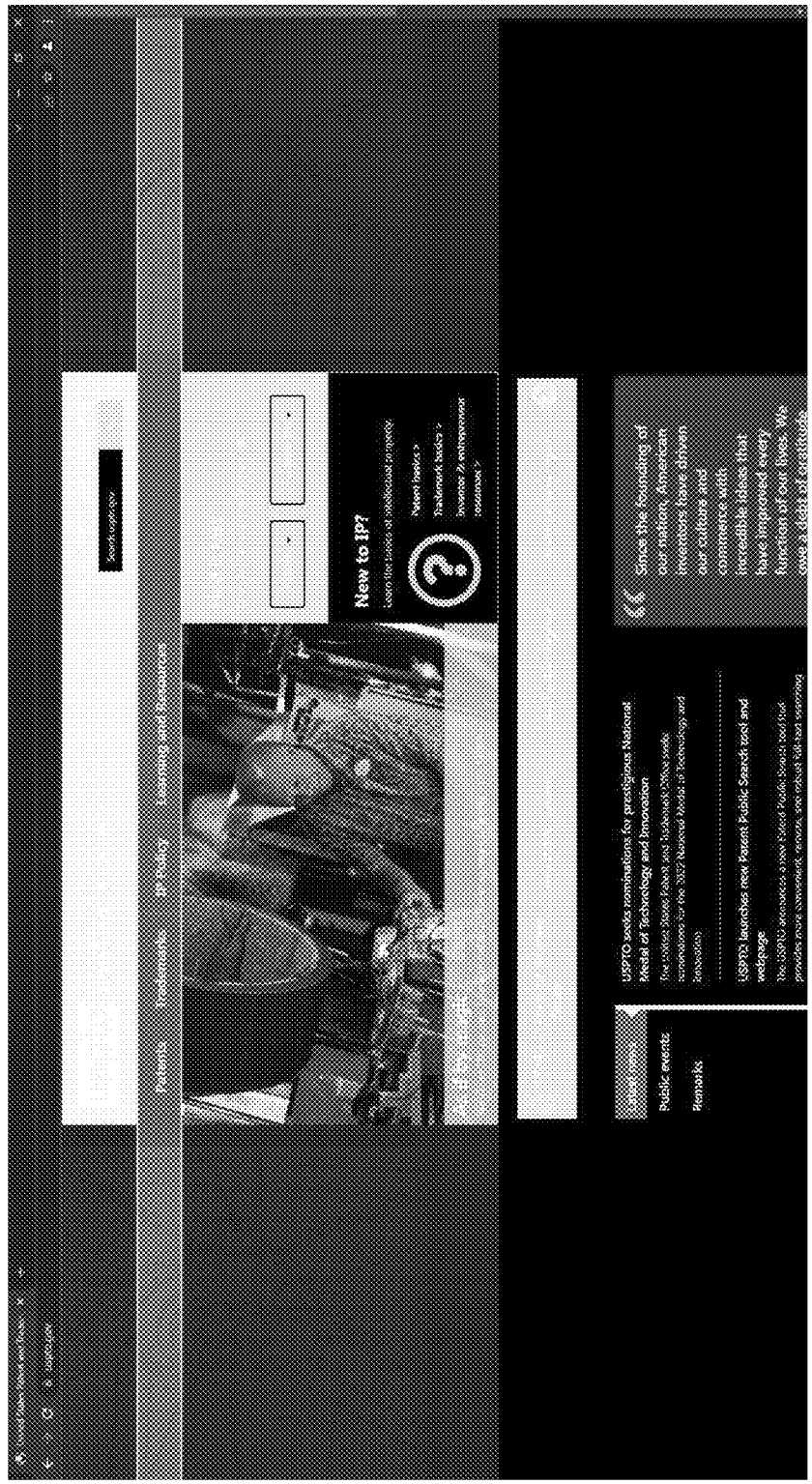
FIG. 4C depicts an alternative embodiment of the web browser of FIGS. 4A-4B, including a dark mode for the web browser and a separate dark mode for assets (including text and images) displayed on the web browser, in accordance with and embodiment of the present invention.

Referring to FIG. 4C, the selected color scheme preference from step 10 of the method described above is a dark mode color scheme, including a darker background and a lighter foreground for the web browser. Similar to the embodiment depicted in FIG. 4B, the color scheme of the web browser, as displayed via the computing device, includes the dark mode color scheme as selected during step 10 of the method, such that the web browser itself is depicted with the selected color preference. In addition, the web browser includes a CSS media query for a dark mode for the web browser, in addition to the dark mode selected color scheme preference for the display of the computing device.

As such, as shown in FIG. 4C, the assets of the website are shown in the selected color scheme preference, rather than the default color scheme as input by the web developer. However, as depicted in FIG. 4C, the selected color scheme preference is not integrated into the default color scheme as input by the web developer. As such, certain assets (such as the top banner of the website displayed by the web browser) do not include contrast between the background and the foreground of the asset, resulting in a rendered asset that is not easily viewable by a user, such that the foreground text is not readable on the background.

Figure 4D:
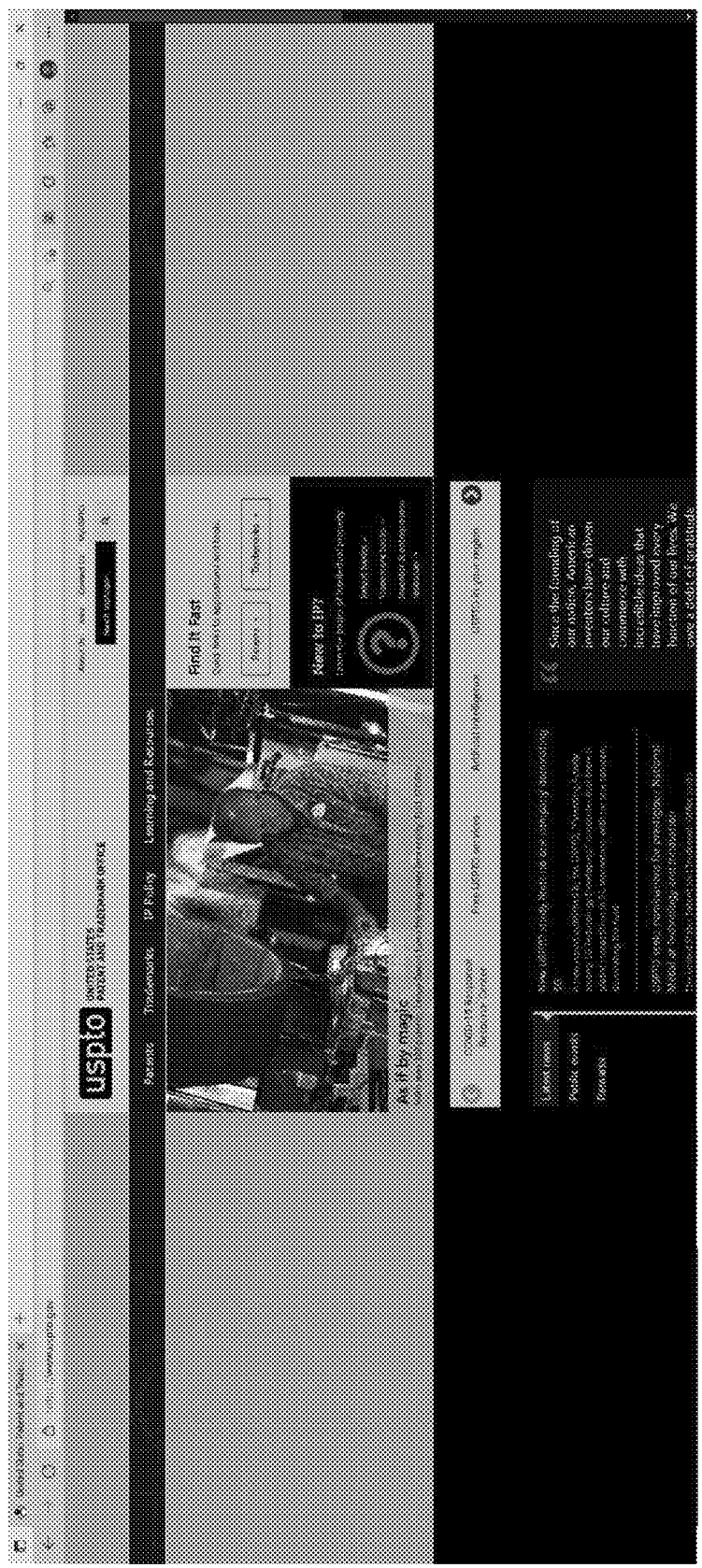
FIG. 4D depicts an alternative embodiment of the web browser of FIGS. 4A-4C, including a dark mode for the web browser in conjunction with a dark mode for assets (including text and images) displayed on the web browser, in accordance with and embodiment of the present invention.

Turning to FIG. 4D, the assets of the website are shown in the selected color scheme preference for the entire viewable page as displayed via the computing device. The assets are altered according to their default color schemes as determined by an input from the web developer, such that the assets are displayed in the selected color scheme without including a failure of contrast between foreground and background of a singular asset. The selected color scheme is displayed as such based on the steps outlined in FIG. 2 and as described above, in which the processor of the computer device transmits the selected color scheme preference to the application and compares values received from the application with the selected color scheme preference values. As such, the final rendered viewable page includes a consistent color scheme preference across the page, including across all assets displayed thereon.

Accordingly, by utilizing the system and method, the processor of the computing device automatically compares an application's color scheme with the default selected color scheme for the computing device via a query to the application. If the application's color scheme matches the preferred color scheme for the computing device, the processor automatically defers to the application's native color scheme and ensures that the selected color scheme for the computing device is deactivated, either by maintaining the selected color scheme in an inactive state or by deactivating the selected color scheme. On the other hand, if the application's color scheme does not match the preferred color scheme for the computing device, the processor automatically activates (or maintains an active status) the selected color scheme of the computing device. As such, the system and method ensure that an optimal color scheme is displayed on the computing device by automatically activating and/or deactivating the selected color scheme based on a match between the native color scheme options of an application and the selected color scheme for the computing device.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of automatically displaying an optimal color inversion scheme on a display device associated with a computing device, the method comprising the steps of:
    selecting, via a processor of the computing device, an operating system color inversion scheme for an operating system to be displayed on the display device associated with the computing device, the color inversion scheme selected from the group consisting of an operating system dark-mode setting and an operating system bright-mode setting;
    loading, into a memory of the computing device, a web browser;
    loading, into the web browser, a web page having a native color inversion scheme, the native color inversion scheme having a native dark-mode setting and a native bright-mode setting;
    transmitting, via the processor of the computing device, a media query to the web browser for the native color inversion scheme of the web page;
    receiving, via the web browser, the native color scheme of the web page, the native color scheme configured to be displayed on the display device associated with the computing device;
    comparing, via the processor, the operating system color inversion scheme with the native color inversion scheme of the web page; and
    automatically displaying the optimal color scheme on the display device associated with the computing device by:
        responsive to determining that the native color inversion scheme of the web page matches the operating system color inversion scheme, deactivating or maintaining a deactivated state of the operating system color inversion scheme and displaying the web page using the native color inversion scheme of the web page in the web browser; and
        responsive to determining that the native color inversion scheme of the web page does not match the operating system color inversion scheme, activating or maintaining an activated state of the operating system color inversion scheme and displaying the web page using the operating system color inversion scheme.

2. The method of claim 1 wherein the native color inversion scheme displays a first set of image assets when in the bright-mode setting and a separate, second set of image assets when in the dark-mode setting.

3. The method of claim 1 wherein the native color inversion scheme displays a first set of text assets when in the bright-mode setting and a separate, second set of text assets when in the dark-mode setting.

4. The method of claim 1 wherein the native color inversion scheme displays an optimized background color when in the dark-mode setting.

5. A method of automatically displaying an optimal color inversion scheme on a display device associated with a computing device, the method comprising the steps of:
    loading, into a memory of the computing device, a web browser having a browser color inversion scheme to be displayed on the display device associated with the computing device, the browser color inversion scheme selected from the group consisting of a browser dark-mode setting and browser bright-mode setting;
    loading, into the web browser, a web page having a native color inversion scheme, the native color inversion scheme having a native dark-mode setting and a native bright-mode setting;
    transmitting, via the processor of the computing device, a media query to the web browser for the native color inversion scheme of the web page;
    receiving, via the web browser, the native color scheme of the web page, the native color scheme configured to be displayed on the display device associated with the computing device;
    comparing, via the processor, the web browser color inversion scheme with the native color inversion scheme of the web page; and
    automatically displaying the optimal color scheme on the display device associated with the computing device by:
        responsive to determining that the native color inversion scheme of the web page matches the web browser color inversion scheme, deactivating or maintaining a deactivated state of the web browser color inversion scheme and displaying the web page using the native color inversion scheme of the web page in the web browser; and
        responsive to determining that the native color inversion scheme of the web page does not match the web browser color inversion scheme, activating or maintaining an activated state of the web browser color inversion scheme and displaying the web page using the web browser color inversion scheme.

6. The method of claim 5 wherein the native color inversion scheme displays a first set of image assets when in the bright-mode setting and a separate, second set of image assets when in the dark-mode setting.

7. The method of claim 5 wherein the native color inversion scheme displays a first set of text assets when in the bright-mode setting and a separate, second set of text assets when in the dark-mode setting.

8. The method of claim 5 wherein the native color inversion scheme displays an optimized background color when in the dark-mode setting.

9. A method of automatically displaying an optimal color inversion scheme on a display device associated with a computing device, the method comprising the steps of:

selecting, via a processor of the computing device, an operating system color inversion scheme for an operating system to be displayed on the display device associated with the computing device, the color inversion scheme selected from the group consisting of an operating system dark-mode setting and an operating system bright-mode setting;

loading, into a memory of the computing device, a web browser having a browser color inversion scheme to be displayed on the display device associated with the computing device, the browser color inversion scheme selected from the group consisting of a browser dark-mode setting and browser bright-mode setting;

loading, into the web browser, a web page having a native color inversion scheme, the native color inversion scheme having a native dark-mode setting and a native bright-mode setting;

transmitting, via the processor of the computing device, a media query to the web browser for the native color inversion scheme of the web page;

receiving, via the web browser, the native color scheme of the web page, the native color scheme configured to be displayed on the display device associated with the computing device;

comparing, via the processor, the operating system color inversion scheme and the browser color inversion scheme with the native color inversion scheme of the web page; and automatically displaying the optimal color scheme on the display device associated with the computing device by:

responsive to determining that the native color inversion scheme of the web page matches either the operating system color inversion scheme or the browser color inversion scheme, deactivating or maintaining a deactivated state of the operating system color inversion scheme and deactivating or maintaining a deactivated state of the browser color inversion scheme and displaying the web page using the native color inversion scheme of the web page in the web browser; and responsive to determining that the native color inversion scheme of the web page does not match either the operating system color inversion scheme or the browser color inversion scheme, activating or maintaining an activated state of the operating system color inversion scheme or activating or maintaining an activated state of the browser color inversion scheme.

10. The method of claim 9 wherein the native color inversion scheme displays a first set of image assets when in the bright-mode setting and a separate, second set of image assets when in the dark-mode setting.

11. The method of claim 9 wherein the native color inversion scheme displays a first set of text assets when in the bright-mode setting and a separate, second set of text assets when in the dark-mode setting.

12. The method of claim 9 wherein the native color inversion scheme displays an optimized background color when in the dark-mode setting.

* * * * *